(12) United States Patent
Yagawa et al.

(10) Patent No.: US 12,421,030 B2
(45) Date of Patent: Sep. 23, 2025

(54) TRAVELING VEHICLE SYSTEM

(71) Applicant: MURATA MACHINERY, LTD., Kyoto (JP)

(72) Inventors: Kazuma Yagawa, Ise (JP); Kazuhiro Ishikawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 556 days.

(21) Appl. No.: 17/906,907

(22) PCT Filed: Feb. 9, 2021

(86) PCT No.: PCT/JP2021/004822
§ 371 (c)(1),
(2) Date: Feb. 23, 2023

(87) PCT Pub. No.: WO2021/192675
PCT Pub. Date: Sep. 30, 2021

(65) Prior Publication Data
US 2023/0294916 A1   Sep. 21, 2023

(30) Foreign Application Priority Data
Mar. 26, 2020  (JP) ................. 2020-056010

(51) Int. Cl.
*B65G 1/04* (2006.01)
*B65G 1/137* (2006.01)

(52) U.S. Cl.
CPC ........... *B65G 1/0421* (2013.01); *B65G 1/137* (2013.01)

(58) Field of Classification Search
CPC ........ B65G 1/0407; B65G 1/0421; B66F 9/07
See application file for complete search history.

(56) References Cited

U.S. PATENT DOCUMENTS

| | | | |
|---|---|---|---|
| 2005/0053450 A1* | 3/2005 | Kantola | B65G 1/0421 414/273 |
| 2008/0053941 A1* | 3/2008 | Tsukamoto | B65G 1/0421 700/214 |
| 2008/0055103 A1 | 3/2008 | Koide | |
| 2016/0137414 A1* | 5/2016 | Tanaka | B66F 9/072 414/277 |
| 2016/0176633 A1* | 6/2016 | Tanaka | B65G 1/0407 414/273 |
| 2017/0267454 A1* | 9/2017 | Adachi | B65G 1/065 |
| 2021/0309457 A1* | 10/2021 | Tsuji | B65G 1/0421 |

(Continued)

FOREIGN PATENT DOCUMENTS

| | | |
|---|---|---|
| JP | 4089154 | 5/2008 |
| JP | 4775650 | 9/2011 |

*Primary Examiner* — Kaitlin S Joerger
(74) *Attorney, Agent, or Firm* — Keating & Bennett, LLP (57) ABSTRACT

A traveling vehicle system (10) is configured such that, in a shared area (12B), a first detectable part (35A, 35B) is disposed at a position detectable by a first detector (85A, 85B) and a second detectable part (36A, 36B) is disposed at a position undetectable by the first detector (85A, 85B) when a first traveling vehicle (7A) is located in a first position (P1), and the second detectable part (36A, 36B) is disposed at a position detectable by a second detector (87A, 87B) and the first detectable part (35A, 35B) is disposed at a position undetectable by the second detector (87A, 87B) when a second traveling vehicle (7B) is located in a second position (P2).

14 Claims, 9 Drawing Sheets

(56) References Cited

U.S. PATENT DOCUMENTS

2022/0135328 A1* 5/2022 Shimamura .......... B65G 1/1371
  700/218
2022/0258970 A1* 8/2022 Sai ....................... B65G 1/0421
2023/0373716 A1* 11/2023 Sai ....................... B65G 1/0421

* cited by examiner

TRAVELING VEHICLE SYSTEM

TECHNICAL FIELD

An aspect of the present invention relates to a traveling vehicle system.

BACKGROUND ART

Automated warehouses including traveling vehicles (stacker cranes) for conveying articles are known. For example, Patent Literature 1 discloses an automated warehouse in which two vehicles of a first traveling vehicle and a second traveling vehicle travel on a single traveling rail, and traveling areas in each of which the corresponding one of the two traveling vehicles travels and a shared area that both of the two traveling vehicles can enter are provided therein. In this shared area, in order to prevent one of the first traveling vehicle and the second traveling vehicle from entering the traveling area of the other of the first traveling vehicle and the second traveling vehicle, it is necessary to detect their own traveling positions.

Thus, these traveling vehicles are provided with rotary encoders to detect their own traveling positions. For example, the article storage facility in Patent Literature 1 is provided with a chain (detectable part) on the traveling rail, and each traveling vehicle travels with a sprocket of the corresponding rotary encoder (detector) meshing with the chain, and detects its own traveling position by detecting the rotation of the sprocket during traveling.

CITATION LIST

Patent Literature

[Patent Literature 1] Japanese Patent No. 4089154

SUMMARY OF INVENTION

Technical Problem

When a traveling rail on which traveling vehicles travel as described above is installed at a site such as a factory, it is more preferable to connect a plurality of divided traveling rails rather than to install a single traveling rail, because a gap between the traveling rails can absorb errors between dimensions of the site where the traveling rails are installed and product dimensions. However, when detectable parts such as chains extending in one direction along the traveling rail are installed with a gap formed therebetween in the traveling direction, each own position cannot be detected because the meshing with the corresponding rotary encoder disengages. Thus, when the traveling rail on which the traveling vehicles travel is formed of a plurality of traveling rail members, certain measures are required for the first traveling vehicle and the second traveling vehicle to properly detect their own positions.

In view of this, it is an object of an aspect of the present invention to provide a traveling vehicle system that can absorb errors between dimensions of a site where a traveling rail is installed and product dimensions, and in which a first traveling vehicle and a second traveling vehicle can properly detect their own positions.

Solution to Problem

The traveling vehicle system according to an aspect of the present invention includes: a traveling rail including a first rail member and a second rail member extending horizontally; a first traveling vehicle and a second traveling vehicle configured to travel on the traveling rail; a first detectable part provided with the first rail member and extending along an extending direction of the traveling rail; a second detectable part provided with the second rail member and extending along the extending direction of the traveling rail; a first detector provided with the first traveling vehicle and configured to detect the first detectable part; and a second detector provided with the second traveling vehicle and configured to detect the second detectable part. Along the traveling rail, a first area where the first traveling vehicle is able to travel and the second traveling vehicle is unable to travel; a second area where the second traveling vehicle is able to travel and the first traveling vehicle is unable to travel; and a shared area, provided between the first area and the second area, where both the first traveling vehicle and the second traveling vehicle are able to travel are formed. In the shared area, a connecting portion in which the first rail member and the second rail member are connected with a gap therebetween or in a manner being in contact with each other is provided. The first detectable part is disposed at a position detectable by the first detector and the second detectable part is disposed at a position undetectable by the first detector when the first traveling vehicle is located in a first position being at an end of the first rail member closer to the connecting portion in the shared area. The second detectable part is disposed at a position detectable by the second detector and the first detectable part is disposed at a position undetectable by the second detector when the second traveling vehicle is located in a second position being at an end of the second rail member closer to the connecting portion in the shared area.

In this configuration, the traveling rail is formed by the first rail member and the second rail member. This allows the gap to be formed between the first rail member and the second rail member in a manner adjusted to dimensions of the site when the traveling rail is disposed, and thus errors with respect to product dimensions can be absorbed. Furthermore, in this configuration, it is possible to detect whether the first traveling vehicle is located at the end of the first rail member and whether the second traveling vehicle is located at the end of the second rail member in the shared area. Errors between the dimensions of the site where the traveling rail is installed and the product dimensions can be absorbed, and also the first traveling vehicle and the second traveling vehicle can properly detect their own positions.

In the traveling vehicle system according to an aspect of the present invention, the first detectable part and the second detectable part may be disposed so as not to overlap each other in the extending direction of the traveling rail. By this configuration, the installation space for the first detectable part and the second detectable part can be reduced.

In the traveling vehicle system according to an aspect of the present invention, the first detectable part and the second detectable part may be disposed in a line along the extending direction of the traveling rail. By this configuration, a unit including the first detectable part to be attached to the first rail member and a unit including the second detectable part to be attached to the second rail member can be standardized.

In the traveling vehicle system according to an aspect of the present invention, the first detector and the second detector may be encoders, and the first detectable part and the second detectable part may be racks configured to mesh with gears attached to the encoders. In this traveling vehicle system, the first detector, the second detector, the first detectable part, and the second detectable part can be easily configured.

The traveling vehicle system according to an aspect of the present invention may further include a first control unit configured to determine, whether the first traveling vehicle is located in the first position and to determine based on a detection result of the first detector, whether the second traveling vehicle is located in the second position based on a detection result of the second detector. The first control unit may control the first traveling vehicle so as not to enter the second area beyond the first position, and may control the second traveling vehicle so as not to enter the connecting portion beyond the second position. By this configuration, one of the first traveling vehicle and the second traveling vehicle can be prevented from entering the traveling area of the other of the first traveling vehicle and the second traveling vehicle from the shared area.

The traveling vehicle system according to an aspect of the present invention may further include a third detector configured to detect a third detectable part and a fourth detector configured to detect a fourth detectable part. One of the third detector and the third detectable part may be provided with one of the first traveling vehicle and the shared area, and the other of the third detector and the third detectable part may be provided with the other of the first traveling vehicle and the shared area. One of the fourth detector and the fourth detectable part may be provided with one of the second traveling vehicle and the shared area, and the other of the fourth detector and the fourth detectable part may be provided with the other of the second traveling vehicle and the shared area. The third detectable part may be disposed at a position detectable by the third detector and also the fourth detectable part may be disposed at a position undetectable by the third detector when the first traveling vehicle is located in the first position being at the end of the first rail member closer to the connecting portion in the shared area. The fourth detectable part may be disposed at a position detectable by the fourth detector and also the third detectable part may be disposed at a position undetectable by the fourth detector when the first traveling vehicle is located in the second position being at the end of the second rail member closer to the connecting portion in the shared area.

By this configuration, it is possible to detect whether the first traveling vehicle is located at the end of the first rail member and whether the second traveling vehicle is located at the end of the second rail member in the shared area. Thus, errors between the dimensions of the site where the traveling rail is installed and the product dimensions can be absorbed, and also the first traveling vehicle and the second traveling vehicle can more properly detect their own positions.

A traveling vehicle system according to an aspect of the present invention includes: a traveling rail including a first rail member and a second rail member extending horizontally; a first traveling vehicle and a second traveling vehicle configured to travel on the traveling rail; a third detector configured to detect a third detectable part; and a fourth detector configured to detect a fourth detectable part. Along the traveling rail, a first area where the first traveling vehicle is able to travel and the second traveling vehicle is unable to travel; a second area where the second traveling vehicle is able to travel and the first traveling vehicle is unable to travel; and a shared area, provided between the first area and the second area, where both the first traveling vehicle and the second traveling vehicle are able to travel are formed. In the shared area, a connecting portion in which the first rail member and the second rail member are connected with a gap therebetween or so as to be in contact with each other is provided. One of the third detector and the third detectable part is provided with one of the first traveling vehicle and the shared area, and the other of the third detector and the third detectable part is provided with the other of the first traveling vehicle and the shared area. One of the fourth detector and the fourth detectable part is provided with one of the second traveling vehicle and the shared area, and the other of the fourth detector and the fourth detectable part is provided with the other of the second traveling vehicle and the shared area. The third detectable part is disposed at a position detectable by the third detector and the fourth detectable part is disposed at a position undetectable by the third detector when the first traveling vehicle is located in a first position being at an end of the first rail member closer to the connecting portion in the shared area. The fourth detectable part is disposed at a position detectable by the fourth detector and the third detectable part is disposed at a position undetectable by the fourth detector when the first traveling vehicle is located in a second position being at an end of the second rail member closer to the connecting portion in the shared area.

In this configuration, the traveling rail is formed by the first rail member and the second rail member. This allows the gap to be formed between the first rail member and the second rail member in a manner adjusted to the dimensions of the site when the traveling rail is disposed, and thus errors with respect to the product dimensions can be absorbed. In this configuration, in the shared area, travel of the first traveling vehicle can be stopped at the end of the first rail member, and travel of the second traveling vehicle can be stopped at the end of the second rail member. Thus, errors between the dimensions of the site where the traveling rail is installed and the product dimensions can be absorbed, and also the first traveling vehicle and the second traveling vehicle can properly detect their own positions.

In the traveling vehicle system according to an aspect of the present invention, the third detector may be provided with the first traveling vehicle, the third detectable part may be provided in the shared area, the fourth detector may be provided with the second traveling vehicle, and the fourth detectable part may be provided in the shared area. In this configuration, the travel can be controlled by transmitting detection results of the detectors provided with the traveling vehicles directly to the first control unit provided with a traveling vehicle. Furthermore, each traveling vehicle detects the state of its own traveling vehicle, and thus the detection results cannot be mistaken for those of other traveling vehicles.

In the traveling vehicle system according to an aspect of the present invention, the first detector and the second detector may be sensors, and the first detectable part and the second detectable part may be dogs configured to be detected by the sensors. In this traveling vehicle system, the third detector, the fourth detector, the third detectable part, and the fourth detectable part can be easily configured.

The traveling vehicle system according to an aspect of the present invention may further include a second control unit configured to, based on a detection result of the third detector, stop travel of the first traveling vehicle and, based on a detection result of the fourth detector, stop travel of the second traveling vehicle. By this configuration, one of the first traveling vehicle and the second traveling vehicle can be prevented from entering the traveling area of the other of the first traveling vehicle and the second traveling vehicle from the shared area.

A stocker system according to an aspect of the present invention includes: the traveling vehicle system described above; a first stocker provided such that an article is able to be loaded and unloaded between the first stocker and the first traveling vehicle traveling in the first area; a second stocker provided such that an article is able to be loaded and unloaded between the second stocker and the second traveling vehicle traveling in the second area; and a maintenance area disposed between the first stocker and the second stocker along the extending direction of the traveling rail and capable of accommodating the first traveling vehicle and the second traveling vehicles located in the shared area. In this configuration, the traveling vehicle system is applied to an automated warehouse, for example, that includes a plurality of the stockers and a plurality of the traveling vehicles. Thus, errors between the dimensions of the site where the traveling rail is installed and the product dimensions can be absorbed, and also the first traveling vehicle and the second traveling vehicle can properly detect their own positions.

Advantageous Effects of Invention

According to an aspect of the present invention, errors between the dimensions of the site where the traveling rail is installed and the product dimensions can be absorbed, and the first traveling vehicle and the second traveling vehicle can properly detect their own positions.

DESCRIPTION OF EMBODIMENTS

An embodiment will now be described in detail with reference to the drawings. Herein, like or equivalent elements are designated by like reference signs, and duplicate description is omitted.

Figure 1:
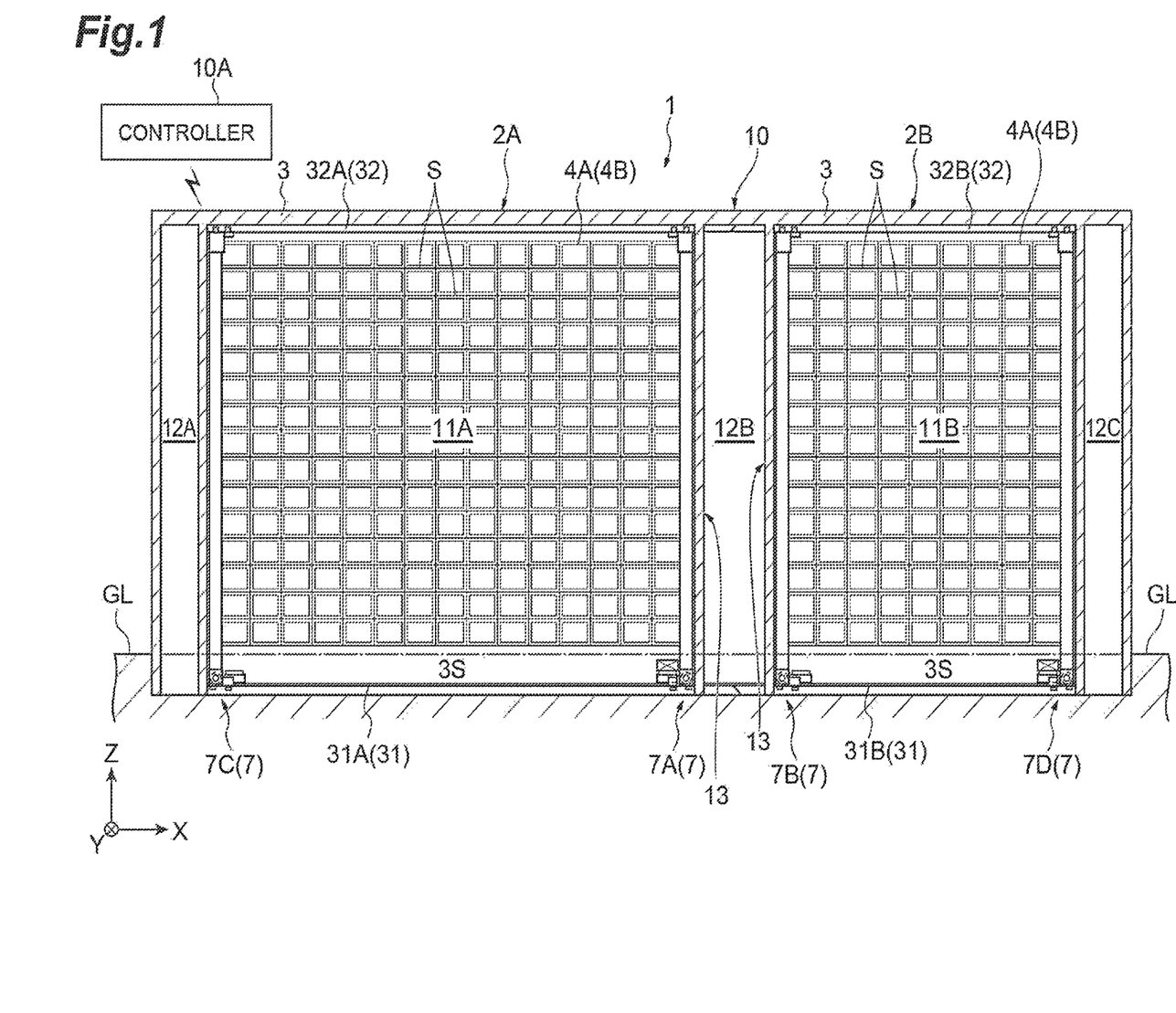
FIG. 1 is a sectional view of a stocker system according to an embodiment when viewed from the front.

As illustrated in FIG. 1, a stocker system 1 includes: two stockers of a stocker (first stocker) 2A and a stocker (second stocker) 2B; and a traveling vehicle system 10 according to the embodiment.

Figure 2:
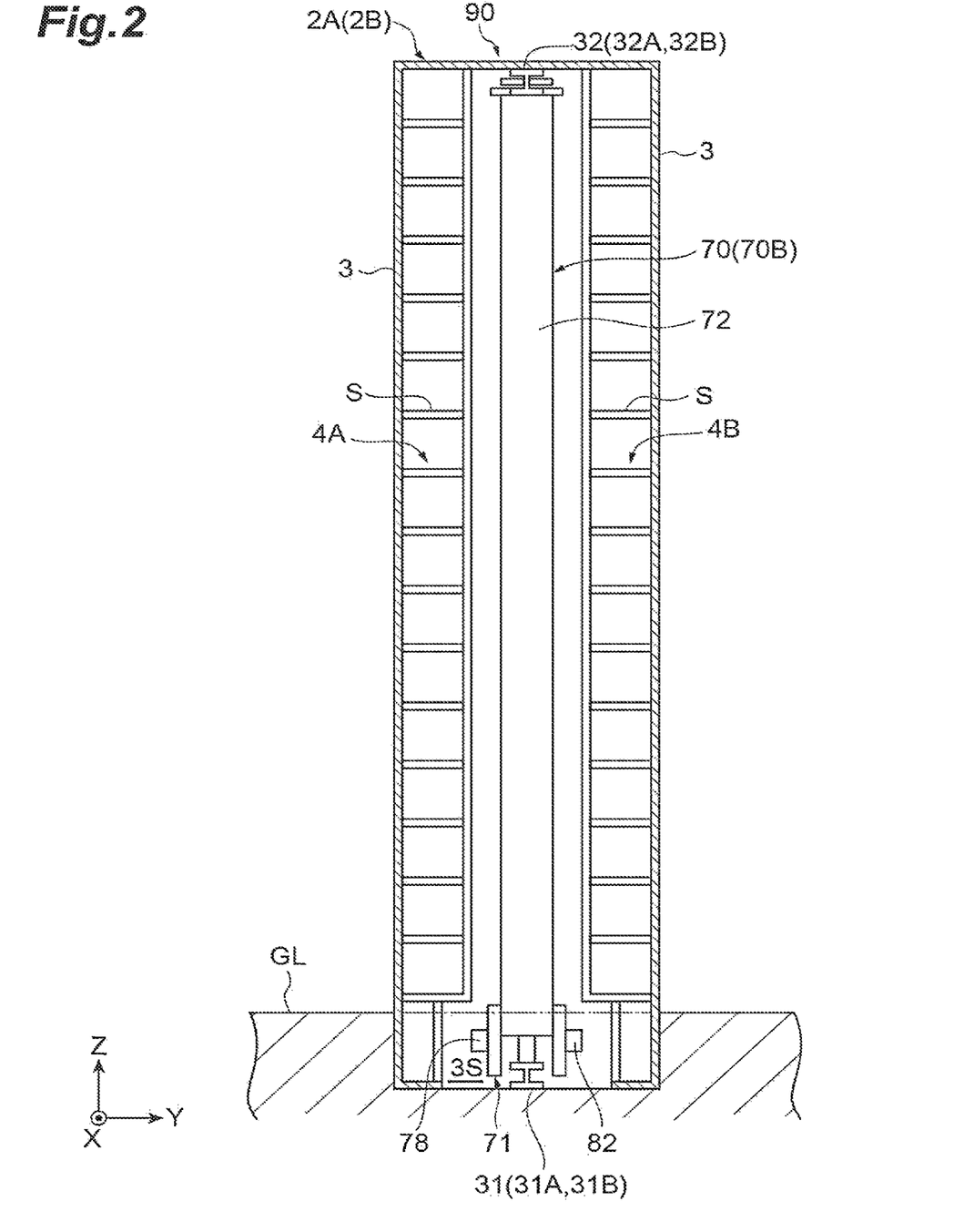
FIG. 2 is a sectional view of an article storage area of a stocker illustrated in FIG. 1 when viewed from the traveling direction of stacker cranes.

As illustrated in FIG. 1 and FIG. 2, articles conveyed by a conveying device, for example, are stored in the stockers 2A, 2B. Examples of the articles include containers such as a front-opening unified pod (FOUP) configured to accommodate wafers to be processed in a semiconductor manufacturing device or a liquid crystal manufacturing device, for example, and a reticle pod configured to accommodate reticles to be used in the semiconductor manufacturing device or the liquid crystal manufacturing device, for example. The stockers 2A, 2B each include a stocker body 3 and racks 4A, 4B.

In the stocker system 1, the two stockers 2A, 2B are arranged in the traveling direction of stacker cranes 7 (a first stacker crane 7A and a second stacker crane 7B). The stocker body 3 is formed in a housing shape (e.g., a hollow rectangular shape) surrounding a certain area extending in one direction. The external shape of the stocker body 3 is formed with frames and panels (not illustrated). In the stocker body 3, an under-floor area 3S that is part of the interior area of the stocker body 3 is formed at a lower position than a floor GL outside the stocker body 3.

The stocker body 3 of the stocker 2A forms an article storage area (first area) 11A accommodating the racks 4A, 4B and maintenance areas 12A, 12B at both ends of the stocker 2A in the traveling direction of the stacker cranes 7. The stocker body 3 of the stocker 2B forms an article storage area (second area) 11B accommodating the racks 4A, 4B and maintenance areas 12B, 12C at both ends of the stocker 2B in the traveling direction of the stacker cranes 7. The maintenance area (shared area) 12B in FIG. 1 is used as both the rightmost maintenance area of the stocker 2A and the leftmost maintenance area of the stocker 2B.

The article storage area 11A is an area where the first stacker crane 7A can travel and the second stacker crane 7B cannot travel. The article storage area 11B is an area where the second stacker crane 7B can travel and the first stacker crane 7A cannot travel. The maintenance area 12B is an area, formed between the article storage area 11A and the article storage area 11B, where both the first stacker crane 7A and the second stacker crane 7B can travel.

As illustrated in FIG. 4 to FIG. 7, the traveling vehicle system 10 includes: a lower traveling rail (traveling rail) 31; an upper traveling rail (traveling rail) 32; the first stacker crane (first traveling vehicle) 7A; the second stacker crane (second traveling vehicle) 7B; a first lower rack (first detectable part) 35A and a first upper rack (first detectable part) 35B; a second lower rack (second detectable part) 36A and a second upper rack (second detectable part) 36B; a first lower encoder (first detector) 85A and a first upper encoder (first detector) 85B; and a second lower encoder (second detector) 87A and a second upper encoder (second detector) 87B.

As illustrated in FIG. 1, the lower traveling rail 31 includes a first rail member 31A and a second rail member 31B extending horizontally. The lower traveling rail 31 may be installed directly on the ground or installed thereon with a support member interposed therebetween. The upper traveling rail 32 includes a first rail member 32A and a second rail member 32B extending horizontally. The upper traveling rail 32 may be installed directly on a ceiling, for example, or installed thereon with a suspending member interposed therebetween. The lower traveling rail 31 and the upper traveling rail 32 are disposed inside the stocker bodies 3, and are vertically opposed to each other.

Figure 4:
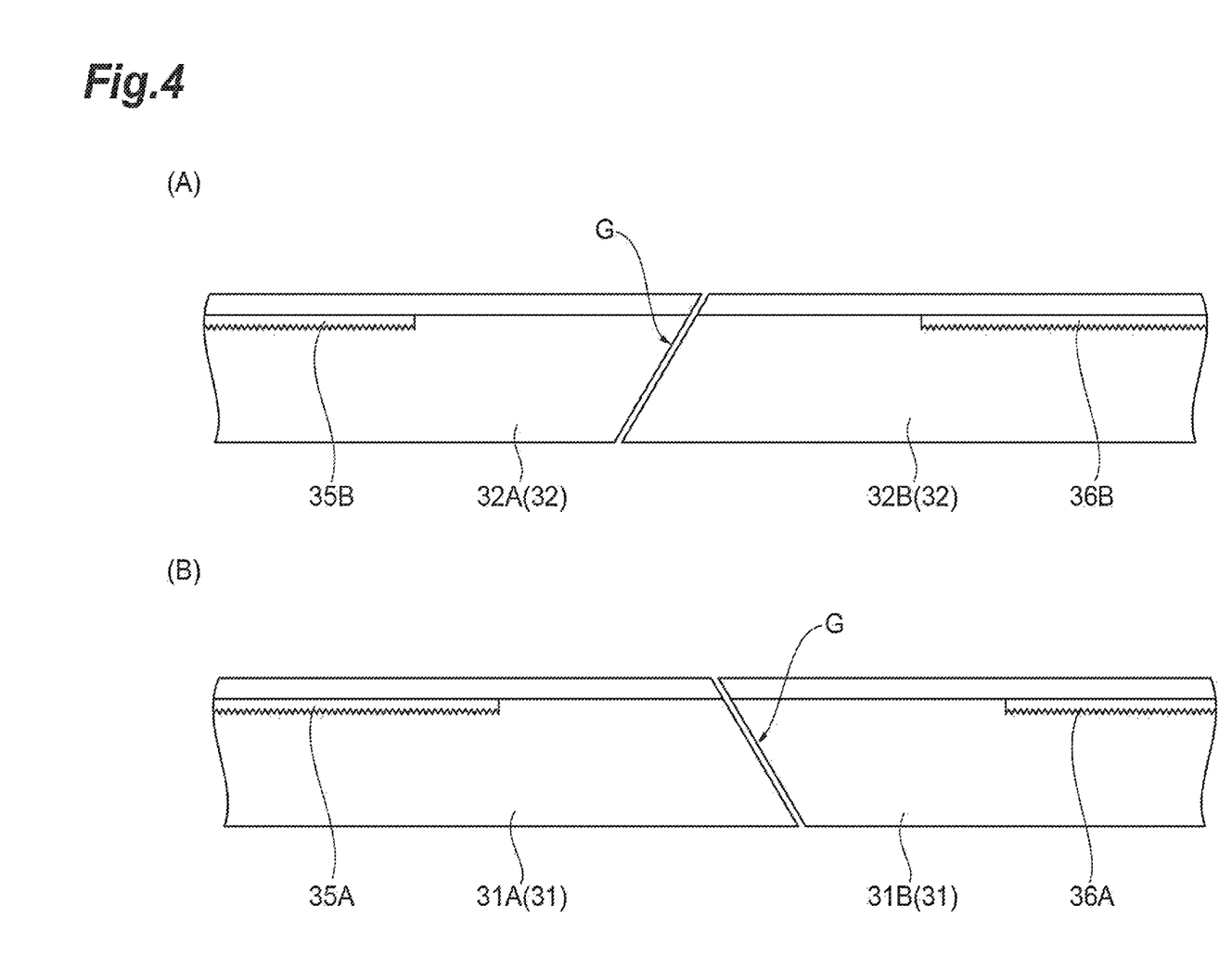
FIG. 4(A) is an enlarged side view of a connecting portion and its surroundings of an upper traveling rail.
FIG. 4(B) is an enlarged side view of a connecting portion and its surroundings of a lower traveling rail.
Figure 5:
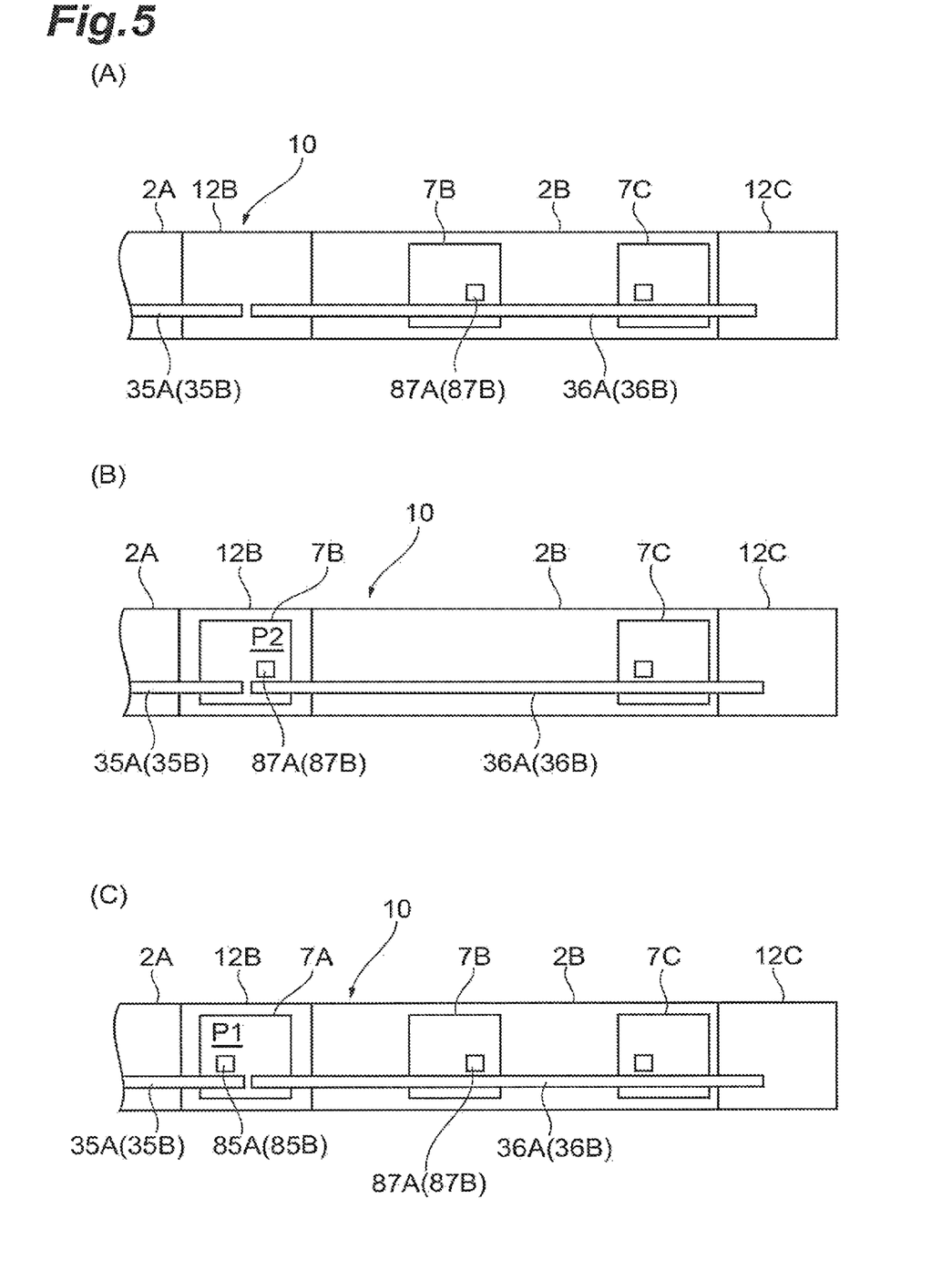
FIG. 5(A) to FIG. 5(C) are explanatory diagrams for explaining a configuration to detect the traveling position of the stacker crane.

As illustrated in FIG. 1 and FIG. 4, the first rail member 31A and the second rail member 31B are connected with a gap G therebetween or so as to be in contact with each other. The first rail member 32A and the second rail member 32B are connected with a gap G therebetween or so as to be in contact with each other. These connecting portions are provided in the maintenance area 12B.

Figure 3:
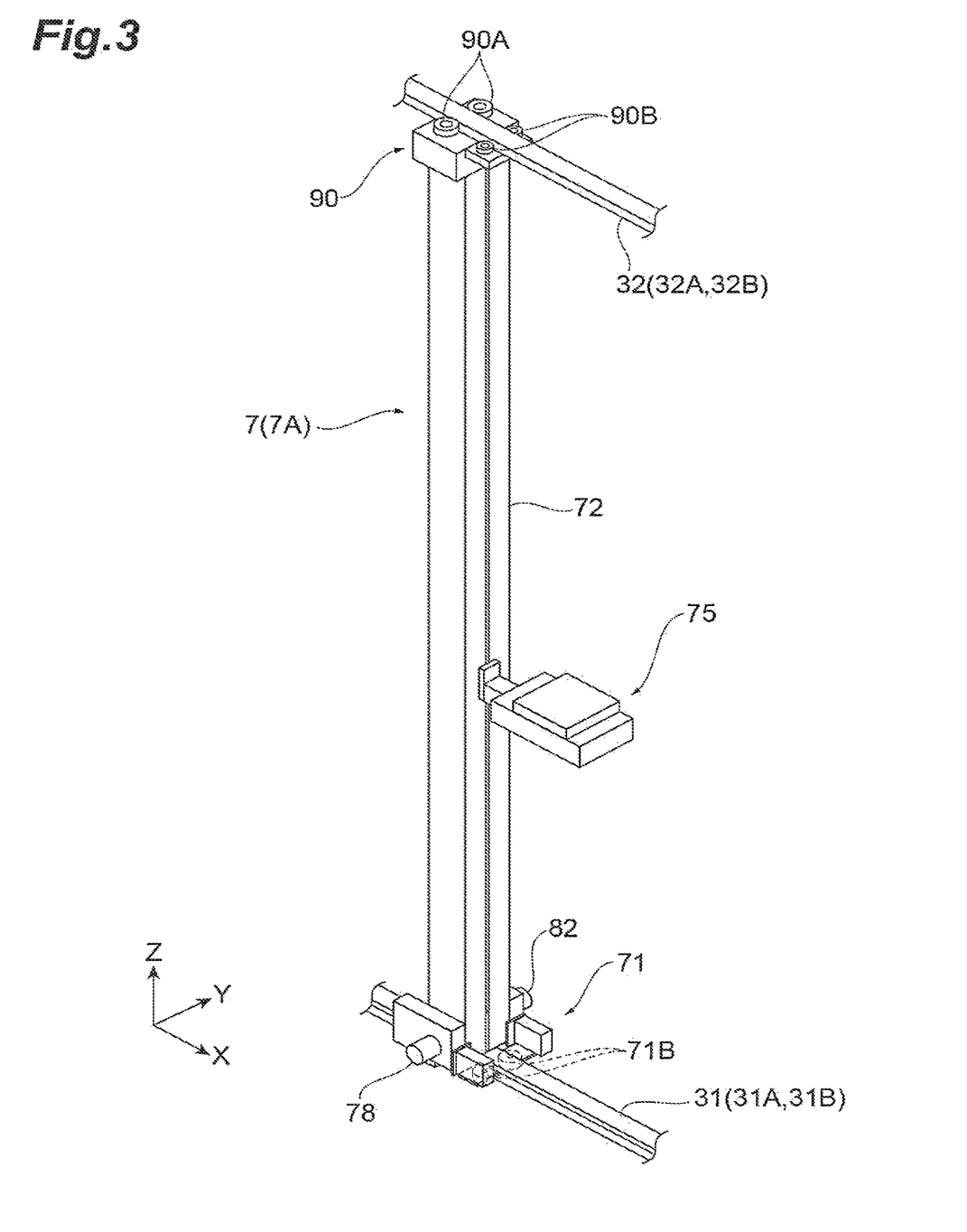
FIG. 3 is a perspective view of a stacker crane included in each stocker in FIG. 1.
Figure 6:
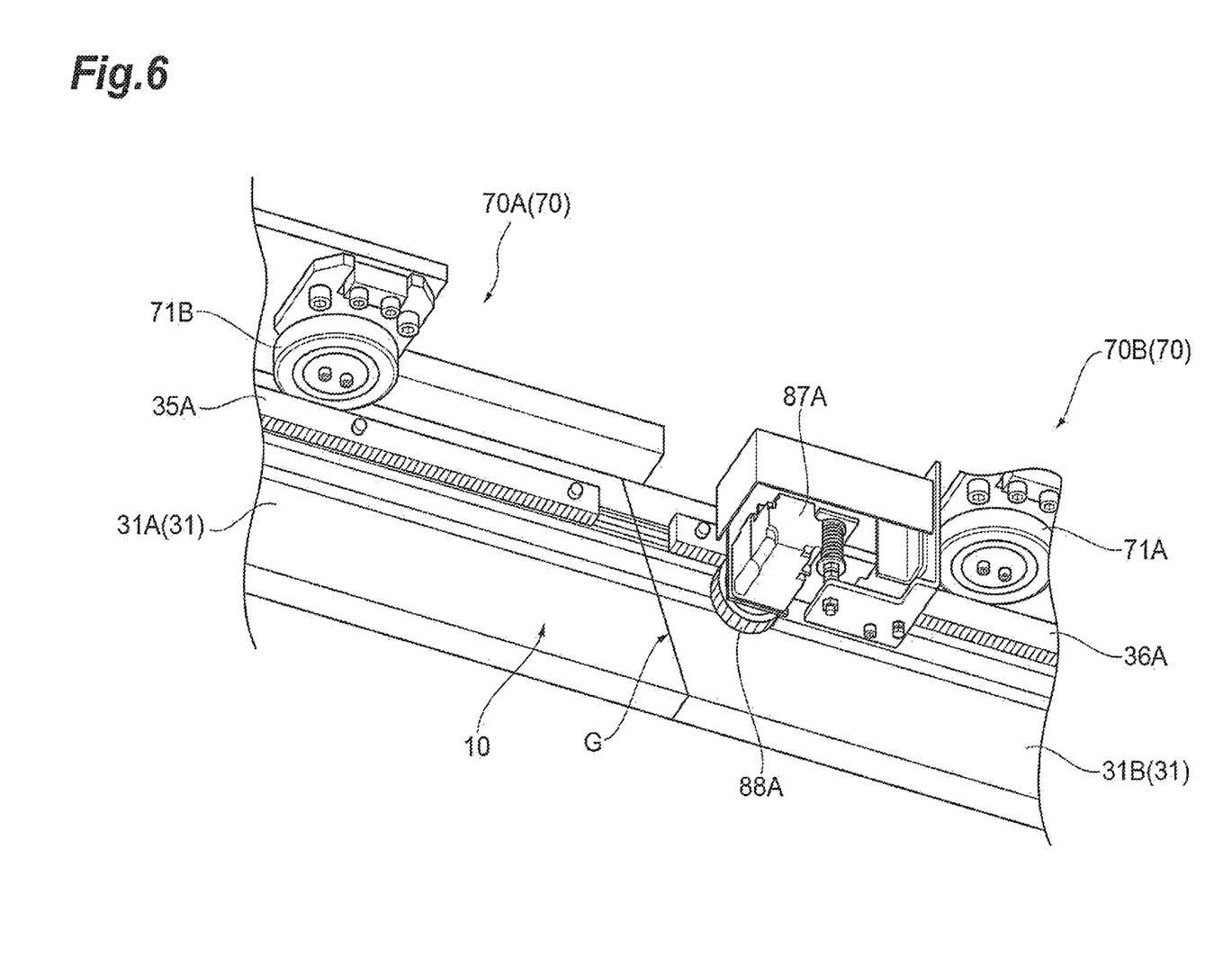
FIG. 6 is a perspective view of a traveling unit of the stacker crane when viewed from below.

As illustrated in FIG. 3 and FIG. 6, each stacker crane 7 includes a traveling unit 71, a mast 72, a lifting platform 75, and an auxiliary traveling unit 90. The traveling unit 71 includes a traveling motor 78 and a lifting motor 82.

The traveling unit 71 travels along the lower traveling rail 31. The traveling unit 71 includes a pair of driving wheels 71A, 71A and a pair of driven wheels 71B, 71B configured to roll while sandwiching side surfaces of the lower traveling rail 31 therebetween. The traveling motor 78 is a driving source of the driving wheels 71A, 71A. The lifting motor 82 is a driving source of the lifting platform 75. The mast 72 is vertically provided with an upper portion of traveling unit 71. The lifting platform 75 is equipped with a transfer device (not illustrated) and, using this transfer device, transfers an article to and from a shelf S and also transfers an article to and from a loading-and-unloading port.

Figure 7:
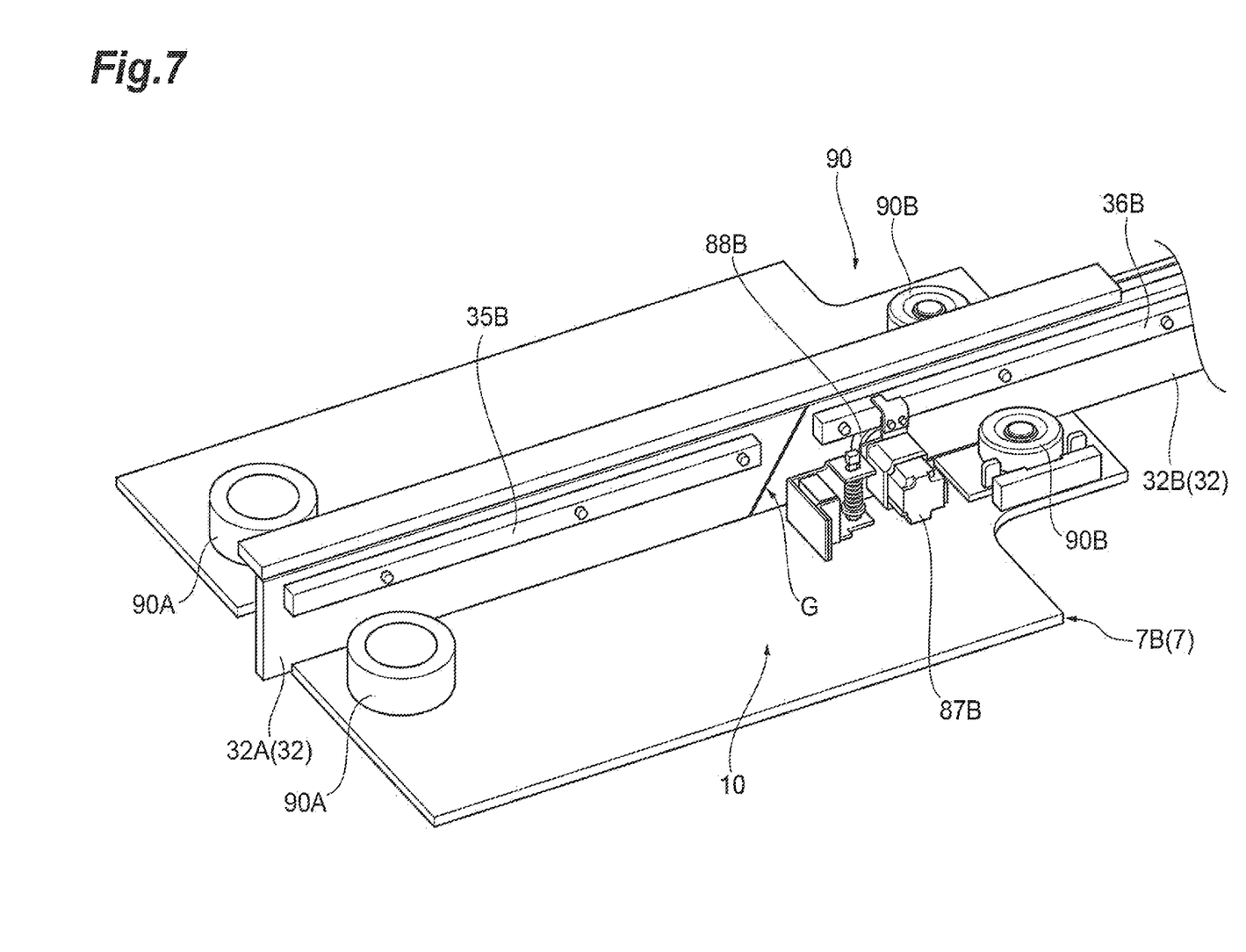
FIG. 7 is a perspective view of an auxiliary traveling unit of the stacker crane when viewed from above.

The auxiliary traveling unit 90 travels along the upper traveling rail 32. The auxiliary traveling unit 90 includes a pair of driving wheels 90A, 90A and a pair of driven wheels 90B, 90B configured to roll while sandwiching the upper traveling rail 32 therebetween.

As illustrated in FIG. 1, the traveling vehicle system 10 according to the present embodiment includes: the first stacker crane (first traveling vehicle) 7A configured to travel on the first rail member 31A and the first rail member 32A; the second stacker crane (second traveling vehicle) 7B configured to travel on the second rail member 31B and the second rail member 32B; a third stacker crane 7C configured to travel on the first rail member 31A and the first rail member 32A; and a fourth stacker crane 7D configured to travel on the second rail member 31B and the second rail member 32B.

As illustrated in FIG. 1 and FIG. 2, two stacker cranes 7 travel inside each of the stockers 2A, 2B. In the present embodiment, the first stacker crane 7A and the third stacker crane 7C travel inside the stocker 2A, and the second stacker crane 7B and the fourth stacker crane 7D travel inside the stocker 2B. Each of the first stacker crane 7A and the third stacker crane 7C travels along the first rail member 31A and the first rail member 32A, conveys an article between a shelf S and the loading-and-unloading port, and transfers (loads and unloads) the article to and from the shelf S. Each of the second stacker crane 7B and the fourth stacker crane 7D travels along the second rail member 31B and the second rail member 32B, conveys an article between a shelf S and the loading-and-unloading port, and transfers the article to and from the shelf S.

As illustrated in FIG. 4(B), the first lower rack 35A is provided with the first rail member 31A and extends along the extending direction of the lower traveling rail 31. On the first lower rack 35A, teeth are formed that mesh with a sprocket (gear) (not illustrated) attached to the first lower encoder 85A (see FIG. 5(C)). As illustrated in FIG. 4(A), the first upper rack 35B is provided with the first rail member 32A and extends along the extending direction of the upper traveling rail 32. On the first upper rack 35B, teeth are formed that mesh with a sprocket (gear) (not illustrated) attached to the first upper encoder 85B (see FIG. 5(C)).

As illustrated in FIG. 4(B), the second lower rack 36A is provided with the second rail member 31B and extends along the extending direction of the lower traveling rail 31. On the second lower rack 36A, teeth are formed that mesh with a sprocket (gear) 88A attached to the second lower encoder 87A (see FIG. 6). As illustrated in FIG. 4(A), the second upper rack 36B is provided with the second rail member 32B and extends along the extending direction of the upper traveling rail 32. On the second upper rack 36B, teeth are formed that mesh with a sprocket (gear) 88B attached to the second upper encoder 87B (see FIG. 7).

As illustrated in FIG. 6, the first lower rack 35A and the second lower rack 36A are disposed so as not to overlap each other in the extending direction of the lower traveling rail 31. The first lower rack 35A and the second lower rack 36A are disposed in a line along the extending direction of the lower traveling rail 31. As illustrated in FIG. 7, the first upper rack 35B and the second upper rack 36B are disposed so as not to overlap each other in the extending direction of the upper traveling rail 32. The first upper rack 35B and the second upper rack 36B are disposed in a line along the extending direction of the upper traveling rail 32.

As illustrated in FIG. 5(C), the first lower encoder 85A is provided with the first stacker crane 7A and detects the first lower rack 35A. More specifically, the first lower encoder 85A detects the number of rotations of the sprocket (not illustrated) meshing with the first lower rack 35A. The first upper encoder 85B is provided with the first stacker crane 7A and detects the first upper rack 35B. More specifically, the first upper encoder 85B detects the number of rotations of the sprocket (not illustrated) meshing with the first upper rack 35B.

As illustrated in FIG. 6, the second lower encoder 87A is provided with the second stacker crane 7B and detects the second lower rack 36A. More specifically, the second lower encoder 87A detects the number of rotations of the sprocket 88A meshing with the second lower rack 36A. As illustrated in FIG. 7, the second upper encoder 87B is provided with the second stacker crane 7B and detects the second upper rack 36B. More specifically, the second upper encoder 87B detects the number of rotations of the sprocket 88B meshing with the second upper rack 36B.

As illustrated in FIG. 5(C), in the traveling vehicle system 10 according to the present embodiment, the first lower rack 35A is disposed at a position detectable by the first lower encoder 85A, the first upper rack 35B is disposed at a position detectable by the first upper encoder 85B, the second lower rack 36A is disposed at a position undetectable by the first lower encoder 85A, and the second upper rack 36B is disposed at a position undetectable by the first upper encoder 85B when the first stacker crane 7A is located in a first position P1 being at ends of the first rail member 31A and the first rail member 32A closer to the respective connecting portions (ends facing the connecting portions) in the maintenance area 12B.

As illustrated in FIG. 5(B), in the traveling vehicle system 10 according to the present embodiment, the second lower rack 36A is disposed at a position detectable by the second lower encoder 87A, the second upper rack 36B is disposed at a position detectable by the second upper encoder 87B, the first lower rack 35A is disposed at a position undetectable by the second lower encoder 87A, and the first upper rack 35B is disposed at a position undetectable by the second upper encoder 87B when the second stacker crane 7B is located in a second position P2 being at ends of the second rail member 31B and the second rail member 32B closer to the respective connecting portions (ends facing the connecting portions) in the maintenance area 12B.

As illustrated in FIG. 1, shutters 13 are provided at the boundary between the stocker 2A and the maintenance area 12B and the boundary between the stocker 2B and the maintenance area 12B. One of the shutters 13 can be opened and closed so as to be set in an open state in which the first stacker crane 7A can come and go between the article storage area 11A and the maintenance area 12B, or in a closed state in which the article storage area 11A and the maintenance area 12B are shielded from each other and the first stacker crane 7A cannot come and go between the article storage area 11A and the maintenance area 12B. Similarly, the other shutter 13 can be opened and closed so as to be set in an open state in which the second stacker crane 7B can come and go between the article storage area 11B and the maintenance area 12B, or in a closed state in which the article storage area 11B and the maintenance area 12B are shielded from each other and the second stacker crane 7B cannot come and go between the article storage area 11B and the maintenance area 12B.

As illustrated in FIG. 1, the stocker system 1 includes a controller (first control unit, second control unit) 10A configured to control the travel of the four stacker cranes 7, for example, provided inside the respective stockers 2A, 2B. Controlled by the controller, the four stacker cranes 7 provided inside the stockers 2A, 2B place articles on shelves S of the racks 4A, 4B and retrieve the articles from the shelves S.

The controller 10A in the present embodiment determines, based on detection results of the first lower encoder 85A and the first upper encoder 85B, whether the first stacker crane 7A is located in the first position P1 and to determines, based on detection results of the second lower encoder 87A and the second upper encoder 87B, whether the second stacker crane 7B is located in the second position P2.

More specifically, the controller 10A determines that the first stacker crane 7A is located in the first position P1, based on the number of rotations of the first lower encoder 85A and/or the first upper encoder 85B that is detected when it is located in the first position P1. The controller 10A also determines that the second stacker crane 7B is located in the second position P2, based on the number of rotations of the second lower encoder 87A and/or the second upper encoder 87B that is detected when it is located in the second position P2.

More specifically, the controller 10A further controls the first stacker crane 7A so as not to enter the stocker 2B beyond the first position P1 and also controls the second stacker crane 7B so as not to enter the stocker 2A beyond the second position P2, based on the above-described determinations that they are located in the first position P1 and the second position P2.

The following describes functional effects of the stocker system 1 according to the present embodiment. In the stocker system 1 according to the present embodiment, the lower traveling rail 31 is formed by the first rail member 31A and the second rail member 31B, and the upper traveling rail 32 is formed by the first rail member 32A and the second rail member 32B. This allows the gap G to be formed between the first rail member 31A and the second rail member 31B and between the first rail member 32A and the second rail member 32B in a manner adjusted to dimensions of the site when the lower traveling rail 31 and the upper traveling rail 32 are disposed, and thus errors with respect to product dimensions can be absorbed.

In the traveling vehicle system 10 according to the present embodiment, it is possible to detect whether the first stacker crane 7A is located at the ends of the first rail member 31A and the first rail member 32A and whether the second stacker crane 7B is located at the ends of the second rail member 31B and the second rail member 32B in the maintenance area 12B. Thus, the first stacker crane 7A and second stacker crane 7B can properly detect their own positions.

In the traveling vehicle system 10 according to the present embodiment, the first lower rack 35A and the second lower rack 36A are disposed and the first upper rack 35B and the second upper rack 36B are disposed so as not to overlap each other in the extending direction of the lower traveling rail 31 and the upper traveling rail 32. This can reduce the installation space for the first lower rack 35A, the second lower rack 36A, the first upper rack 35B, and the second upper rack 36B.

In the traveling vehicle system 10 according to the present embodiment, the first lower rack 35A and the second lower rack 36A are disposed in a line along the extending direction of the lower traveling rail 31, and the first upper rack 35B and the second upper rack 36B are disposed in a line along the extending direction of the upper traveling rail 32. In this configuration, a unit including the first lower rack 35A to be attached to the first rail member 31A and a unit including the second lower rack 36A to be attached to the second rail member 31B can be standardized. Furthermore, a unit including the first upper rack 35B to be attached to the first rail member 32A and a unit including the second upper rack 36B to be attached to the second rail member 32B can be standardized.

In the present embodiment, the traveling vehicle system 10 is applied to the stocker system 1 including the stockers 2A, 2B and the stacker cranes 7. This allows the gap G to be formed between the first rail member 31A and the second rail member 31B and between the first rail member 32A and the second rail member 32B in a manner adjusted to the dimensions of the site when the lower traveling rail 31 and the upper traveling rail 32 are disposed, and thus errors with respect to the product dimensions can be absorbed. Furthermore, the first stacker crane 7A can be prevented from entering the traveling area (stocker 2B) of the second stacker crane 7B from the maintenance area 12B, and the second stacker crane 7B can be prevented from entering the traveling area (stocker 2A) of the first stacker crane 7A from the maintenance area 12B.

Although an embodiment of the present invention has been described above, the present invention is not limited to the embodiment described above, and various modifications may be made without departing from the gist thereof.

In the above embodiment, an example has been described in which the first lower rack 35A and the first upper rack 35B; the second lower rack 36A and the second upper rack 36B; the first lower encoder 85A and the first upper encoder 85B; and the second lower encoder 87A and the second upper encoder 87B are provided. However, instead of or in addition to this configuration, as illustrated in FIG. 8 and FIG. 9, a first lower dog (third detectable part) 37A and a first upper dog (third detectable part) 38A; a second lower dog (fourth detectable part) 37B and a second upper dog (fourth detectable part) 38B; a first lower sensor (not illustrated) (third detector) and a first upper sensor (third detector) (not illustrated); and a second lower sensor (fourth detector) 93 and a second upper sensor (fourth detector) 94 are provided in a modification.

Figure 8:
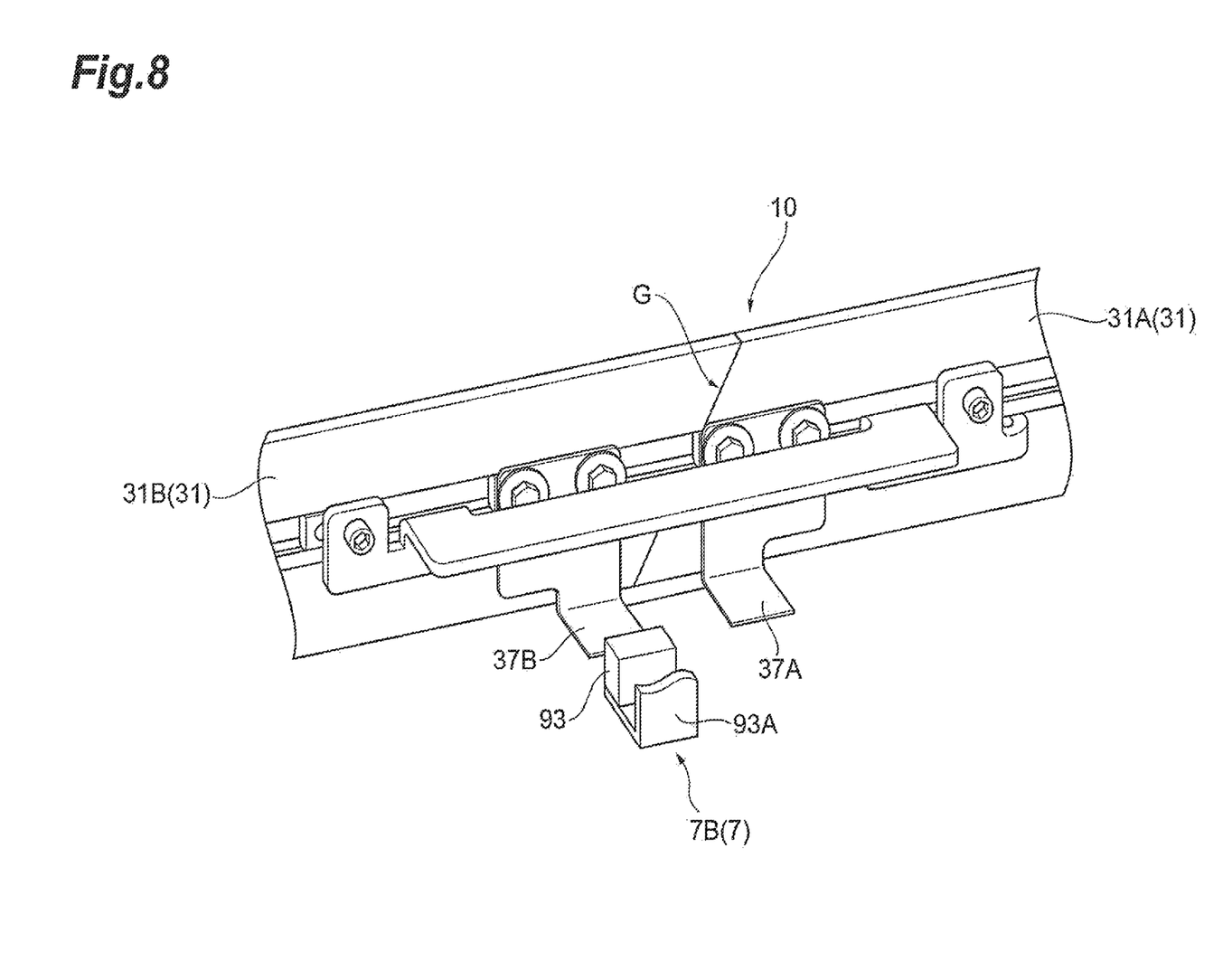
FIG. 8 is a perspective view illustrating a first lower dog and a second lower dog that are fixed to the lower traveling rail.
Figure 9:
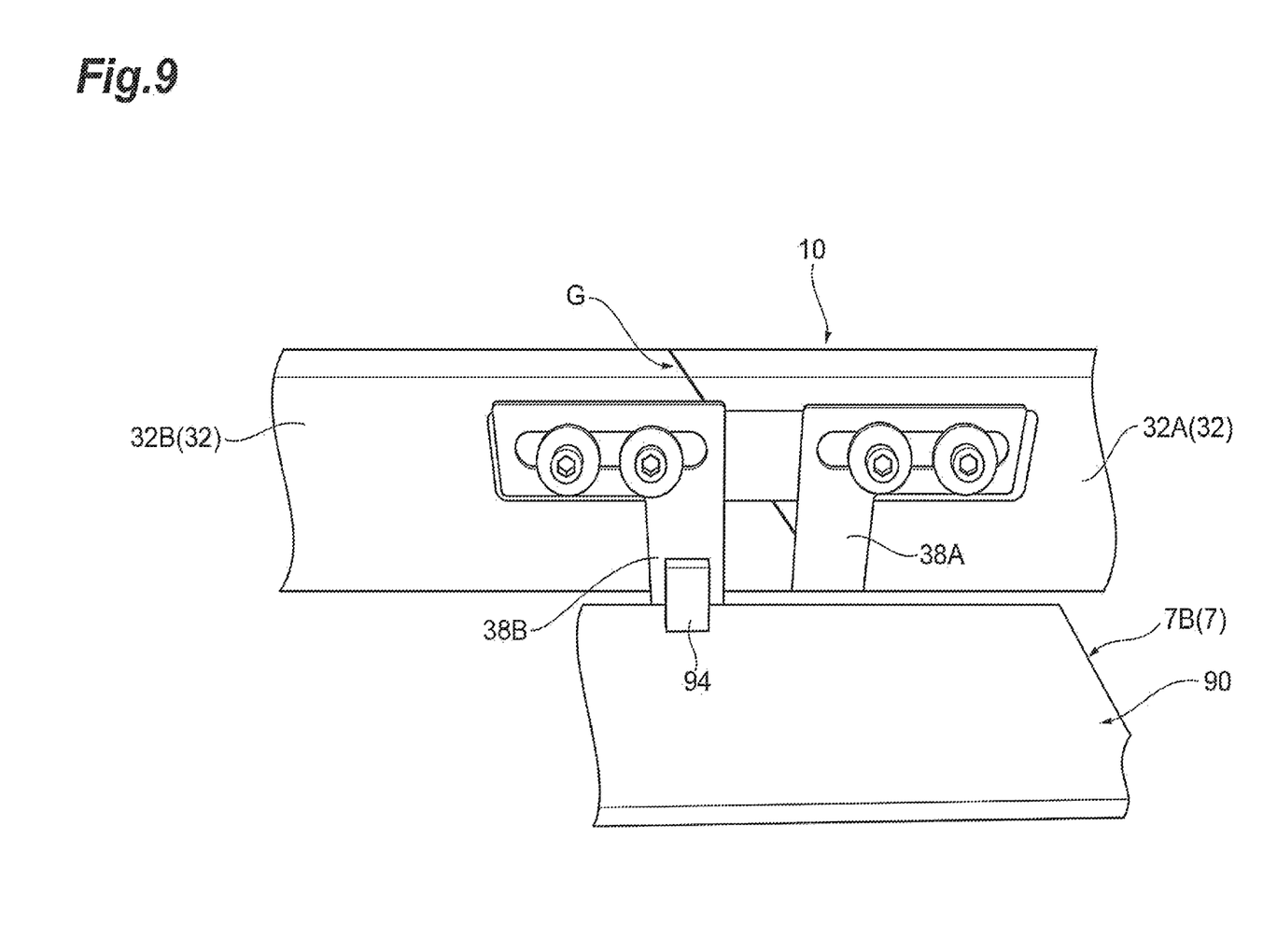
FIG. 9 is a perspective view illustrating a first upper dog and a second upper dog that are fixed to the upper traveling rail.

As illustrated in FIG. 8, the first lower dog 37A is fixed to the first rail member 31A, and the second lower dog 37B is fixed to the second rail member 31B. As illustrated in FIG. 9, the first upper dog 38A is fixed to the first rail member 32A, and the second upper dog 38B is fixed to the second rail member 32B. The first lower sensor is attached to the traveling unit 71 of the first stacker crane 7A with a bracket interposed therebetween, and the second lower sensor 93 is attached to the traveling unit 71 of the second stacker crane 7B with a bracket 93A interposed therebetween. The first upper sensor is fixed to the auxiliary traveling unit 90 of the first stacker crane 7A, and the second upper sensor 94 is fixed to the auxiliary traveling unit 90 of the second stacker crane 7B. Examples of the first lower sensor configured to detect the first lower dog 37A, the first upper sensor configured to detect the first upper dog 38A, the second lower sensor 93 configured to detect the second lower dog 37B, and the second upper sensor 94 configured to detect the second upper dog 38B include proximity sensors and optical sensors.

In a stocker system 1 according to a modification, the controller (first control unit, second control unit) 10A, based on detection results of the first lower sensor and the first upper sensor, stops the travel of the first stacker crane 7A and, based on detection results of the second lower sensor 93 and the second upper sensor 94, stops the travel of the second stacker crane 7B.

In a configuration in which the first lower dog 37A and the first upper dog 38A, the second lower dog 37B and the second upper dog 38B, the first lower sensor and the first upper sensor, and the second lower sensor 93 and the second upper sensor 94 are provided instead of the configuration in the above embodiment, it is possible to detect whether the first stacker crane 7A is located at the ends of the first rail member 31A and the first rail member 32A and whether the second stacker crane 7B is located at the ends of the second rail member 31B and the second rail member 32B in the maintenance area 12B.

Furthermore, in the configuration according to this modification, in the maintenance area 12B, the travel of the first stacker crane 7A can be stopped at the ends of the first rail member 31A and the first rail member 32A, and the travel of the second stacker crane 7B can be stopped at the ends of the second rail member 31B and the second rail member 32B. Thus, the first stacker crane 7A can be prevented from entering the traveling area (stocker 2B) of the second stacker crane 7B from the maintenance area 12B, and the second stacker crane 7B can be prevented from entering the traveling area (stocker 2A) of the first stacker crane 7A from the maintenance area 12B.

In the configuration in which the first lower dog 37A and the first upper dog 38A, the second lower dog 37B and the second upper dog 38B, the first lower sensor and the first upper sensor, the second lower sensor 93 and the second upper sensor 94 are provided in addition to the configuration in the above embodiment, even when the traveling position of the first stacker crane 7A or the second stacker crane 7B cannot be acquired accurately for some reason, the first stacker crane 7A can be prevented from entering the traveling area (stocker 2B) of the second stacker crane 7B from the maintenance area 12B and the second stacker crane 7B can be prevented from entering the traveling area (stocker 2A) of the first stacker crane 7A from the maintenance area 12B.

In the embodiment and the modifications above, an example has been described in which the first lower rack 35A and the first upper rack 35B are provided and the second lower rack 36A and the second upper rack 36B are provided with both the lower traveling rail 31 and the upper traveling rail 32, respectively. However, the present invention is not limited to this configuration. For example, the first lower rack 35A and the first upper rack 35B, or the second lower rack 36A and the second upper rack 36B may be provided with one of the lower traveling rail 31 and the upper traveling rail 32. In a configuration in which the first lower rack 35A and the second lower rack 36A are provided with the lower traveling rail 31, only the first lower encoder 85A may be provided with the first stacker crane 7A and only the second lower encoder 87A may be provided with the second stacker crane 7B. In a configuration in which the first upper rack 35B and the second upper rack 36B are provided with the upper traveling rail 32, only the first upper encoder 85B may be provided with the first stacker crane 7A and only the second upper encoder 87B may be provided with the second stacker crane 7B.

In the embodiment and the modifications above, an example has been described in which the gap G is formed between the first rail member 31A and the second rail member 31B and between the first rail member 32A and the second rail member 32B. However, these rails may be provided so as to be in contact with each other without providing the gap G. The first rail member 31A may be divided into a plurality of members with gaps formed between the members. Similarly, the first rail member 32A, the second rail member 31B, and the second rail member 32B may be divided into a plurality of members with gaps formed between the members. By this configuration, errors between the dimensions of the site where the traveling rails are installed and the product dimensions can be more flexibly absorbed.

When the first rail member 31A is divided into a plurality of members, the first lower rack 35A is attached so as to extend across the members after the members are installed on the site. The same applies to the cases when the first rail member 32A, the second rail member 31B, and the second rail member 32B are divided into a plurality of members, and the first upper rack 35B, the second lower rack 36A, and the second upper rack 36B each are also attached to their respective members in the same manner.

Even when the gaps are formed in each of the first rail members 31A, 32A and/or the second rail members 31B, 32B as described above, the gap G being at the connecting portion between the first rail member 31A and the second rail member 31B and the gap G corresponding to the connecting portion between the first rail member 32A and the second rail member 32B are formed each at one location. More specifically, each of the ends (the first position P1) of the first rail members 31A, 32A closer to the respective connecting portions in the maintenance area 12B is an end facing the corresponding one gap G described above, and is also an end of a range in which the first stacker crane 7A can travel on the first rail members 31A, 32A. Each of the ends (second position P2) of the second rail members 31B, 32B closer to the respective connecting portions in the maintenance area 12B is an end facing the corresponding one gap G described above, and is also an end of a range in which the second stacker crane 7B can travel on the second rail members 31B, 32B.

In the above modifications, an example has been described in which the second lower sensor 93 and the second upper sensor 94 that are detectors are provided with the first stacker crane 7A and the second stacker crane 7B, and the first lower dog 37A, the second lower dog 37B, the first upper dog 38A, and the second upper dog 38B that are detectable parts are provided with the lower traveling rail 31 and the upper traveling rail 32. However, the detectable parts may be provided with the first stacker crane 7A and the second stacker crane 7B, and the detectors may be provided with the lower traveling rail 31 and the upper traveling rail 32.

REFERENCE SIGNS LIST

1 . . . stocker system
2A . . . stocker (first stocker)

2B . . . stocker (first stocker)
7A . . . first stacker crane
7B . . . second stacker crane
10 . . . traveling vehicle system
10A . . . controller (first control unit, second control unit)
11A . . . article storage area (first area)
11B . . . article storage area (second area)
12B . . . maintenance area (shared area)
31 . . . lower traveling rail (traveling rail)
31A, 32A . . . first rail member
31B, 32B . . . second rail member
32 . . . upper traveling rail (traveling rail)
35A . . . first lower rack (first detectable part)
35B . . . first upper rack (first detectable part)
36A . . . second lower rack (second detectable part)
36B . . . second upper rack (second detectable part)
37A . . . first lower dog (third detectable part)
37B . . . second lower dog (fourth detectable part)
38A . . . first upper dog (third detectable part)
38B . . . second upper dog (fourth detectable part)
85A . . . first lower encoder (first detector)
85B . . . first upper encoder (first detector)
87A . . . second lower encoder (second detector)
87B . . . second upper encoder (second detector)
93 . . . second lower sensor (fourth detector)
94 . . . second upper sensor (fourth detector)
G . . . gap
P1 . . . first position
P2 . . . second position

The invention claimed is:

1. A traveling vehicle system comprising:
a traveling rail including a first rail member and a second rail member extending horizontally;
a first traveling vehicle and a second traveling vehicle configured to travel on the traveling rail;
a first detectable part provided with the first rail member and extending along an extending direction of the traveling rail;
a second detectable part provided with the second rail member and extending along the extending direction of the traveling rail;
a first detector provided with the first traveling vehicle and configured to detect the first detectable part; and
a second detector provided with the second traveling vehicle and configured to detect the second detectable part, wherein
the traveling rail comprises a first area where the first traveling vehicle is able to travel and the second traveling vehicle is unable to travel; a second area where the second traveling vehicle is able to travel and the first traveling vehicle is unable to travel; and a shared area, provided between the first area and the second area, where both the first traveling vehicle and the second traveling vehicle are able to travel,
the shared area is provided with a connecting portion in which the first rail member and the second rail member are connected with a gap therebetween or so as to be in contact with each other,
the first detectable part is disposed at a position detectable by the first detector and the second detectable part is disposed at a position undetectable by the first detector when the first traveling vehicle is located in a first position being at an end of the first rail member closer to the connecting portion in the shared area, and
the second detectable part is disposed at a position detectable by the second detector and the first detectable part is disposed at a position undetectable by the second detector when the second traveling vehicle is located in a second position being at an end of the second rail member closer to the connecting portion in the shared area.

2. The traveling vehicle system according to claim 1, wherein the first detectable part and the second detectable part are disposed so as not to overlap each other in the extending direction of the traveling rail.

3. The traveling vehicle system according to claim 1, wherein the first detectable part and the second detectable part are disposed in a line the extending direction of the traveling rail.

4. The traveling vehicle system according to claim 1, wherein
the first detector and the second detector are encoders, and
the first detectable part and the second detectable part are racks configured to mesh with gears attached to the encoders.

5. The traveling vehicle system according to claim 1, further comprising a first control unit configured to determine whether the first traveling vehicle is located in the first position based on a detection result of the first detector and to determine whether the second traveling vehicle is located in the second position based on a detection result of the second detector, wherein
the first control unit controls the first traveling vehicle so as not to enter the second area beyond the first position and controls the second traveling vehicle so as not to enter the first area beyond the second position.

6. The traveling vehicle system according to claim 1, further comprising:
a third detector configured to detect a third detectable part; and
a fourth detector configured to detect a fourth detectable part, wherein
one of the third detector and the third detectable part is provided with one of the first traveling vehicle and the shared area and the other of the third detector and the third detectable part is provided with the other of the first traveling vehicle and the shared area,
one of the fourth detector and the fourth detectable part is provided with one of the second traveling vehicle and the shared area and the other of the fourth detector and the fourth detectable part is provided with the other of the second traveling vehicle and the shared area,
the third detectable part is disposed at a position detectable by the third detector and the fourth detectable part is disposed at a position undetectable by the third detector when the first traveling vehicle is located in the first position being at the end of the first rail member closer to the connecting portion in the shared area, and
the fourth detectable part is disposed at a position detectable by the fourth detector and the third detectable part is disposed at a position undetectable by the fourth detector when the first traveling vehicle is located in the second position being at the end of the second rail member closer to the connecting portion in the shared area.

7. The traveling vehicle system according to claim 6, wherein
the third detector and the fourth detector are sensors, and
the third detectable part and the fourth detectable part are dogs configured to be detected by the sensors.

8. The traveling vehicle system according to claim 6, further comprising a second control unit configured to stop travel of the first traveling vehicle based on a detection result of the third detector and to stop travel of the second traveling vehicle based on a detection result of the fourth detector.

9. A traveling vehicle system comprising:
a traveling rail including a first rail member and a second rail member extending horizontally;
a first traveling vehicle and a second traveling vehicle configured to travel on the traveling rail;
a third detector configured to detect a third detectable part; and
a fourth detector configured to detect a fourth detectable part, wherein
the traveling rail comprises a first area where the first traveling vehicle is able to travel and the second traveling vehicle is unable to travel, a second area where the second traveling vehicle is able to travel and the first traveling vehicle is unable to travel, and a shared area provided between the first area and the second area where both the first traveling vehicle and the second traveling vehicle are able to travel,
the shared area is provided with a connecting portion in which the first rail member and the second rail member are connected with a gap therebetween or so as to be in contact with each other,
one of the third detector and the third detectable part is provided with one of the first traveling vehicle and the shared area and the other of the third detector and the third detectable part is provided with the other of the first traveling vehicle and the shared area,
one of the fourth detector and the fourth detectable part is provided with one of the second traveling vehicle and the shared area, and the other of the fourth detector and the fourth detectable part is provided with the other of the second traveling vehicle and the shared area,
the third detectable part is disposed at a position detectable by the third detector and the fourth detectable part is disposed at a position undetectable by the third detector when the first traveling vehicle is located in a first position being at an end of the first rail member closer to the connecting portion in the shared area, and
the fourth detectable part is disposed at a position detectable by the fourth detector and the third detectable part is disposed at a position undetectable by the fourth detector when the second traveling vehicle is located in a second position being at an end of the second rail member closer to the connecting portion in the shared area.

10. The traveling vehicle system according to claim 9, wherein
the third detector is provided with the first traveling vehicle and the third detectable part is provided in the shared area, and
the fourth detector is provided with the second traveling vehicle and the fourth detectable part is provided in the shared area.

11. The traveling vehicle system according to claim 9, further comprising a second control unit configured to stop travel of the first traveling vehicle based on a detection result of the third detector and to stop travel of the second traveling vehicle based on a detection result of the fourth detector.

12. A stocker system comprising:
a traveling vehicle system comprises;
a traveling rail including a first rail member and a second rail member extending horizontally;
a first traveling vehicle and a second traveling vehicle configured to travel on the traveling rail;
a first detectable part provided with the first rail member and extending along an extending direction of the traveling rail;
a second detectable part provided with the second rail member and extending along the extending direction of the traveling rail;
a first detector provided with the first traveling vehicle and configured to detect the first detectable part; and
a second detector provided with the second traveling vehicle and configured to detect the second detectable part, wherein
the traveling rail comprises a first area where the first traveling vehicle is able to travel and the second traveling vehicle is unable to travel; a second area where the second traveling vehicle is able to travel and the first traveling vehicle is unable to travel; and a shared area, provided between the first area and the second area, where both the first traveling vehicle and the second traveling vehicle are able to travel,
the shared area is provided with a connecting portion in which the first rail member and the second rail member are connected with a gap therebetween or so as to be in contact with each other,
the first detectable part is disposed at a position detectable by the first detector and the second detectable part is disposed at a position undetectable by the first detector when the first traveling vehicle is located in a first position being at an end of the first rail member closer to the connecting portion in the shared area, and
the second detectable part is disposed at a position detectable by the second detector and the first detectable part is disposed at a position undetectable by the second detector when the second traveling vehicle is located in a second position being at an end of the second rail member closer to the connecting portion in the shared area;
a first stocker provided such that an article is able to be loaded and unloaded between the first stocker and the first traveling vehicle traveling in the first area;
a second stocker provided such that an article is able to be loaded and unloaded between the second stocker and the second traveling vehicle traveling in the second area; and
a maintenance area disposed between the first stocker and the second stocker the extending direction of the traveling rail and capable of accommodating the first traveling vehicle and the second traveling vehicles located in the shared area.

13. The traveling vehicle system according to claim 9, wherein
the third detector and the fourth detector are sensors, and
the third detectable part and the fourth detectable part are dogs configured to be detected by the sensors.

14. A stocker system comprising:
a traveling vehicle system comprising:
a traveling rail including a first rail member and a second rail member extending horizontally;
a first traveling vehicle and a second traveling vehicle configured to travel on the traveling rail;
a third detector configured to detect a third detectable part; and
a fourth detector configured to detect a fourth detectable part, wherein
the traveling rail comprises a first area where the first traveling vehicle is able to travel and the second traveling vehicle is unable to travel; a second area where the second traveling vehicle is able to travel and the first traveling vehicle is unable to travel, and a shared area, provided between the first area and the second area, where both the first traveling vehicle and the second traveling vehicle are formed, the shared area is provided with a connecting portion in which the first rail member and the second rail member are connected with a gap therebetween or so as to be in contact with each other, one of the third detector and the third detectable part is provided with one of the first traveling vehicle and the shared area and the other of the third detector and the third detectable part is provided with the other of the first traveling vehicle and the shared area, one of the fourth detector and the fourth detectable part is provided with one of the second traveling vehicle and the shared area, and the other of the fourth detector and the fourth detectable part is provided with the other of the second traveling vehicle and the shared area, the third detectable part is disposed at a position detectable by the third detector and the fourth detectable part is disposed at a position undetectable by the third detector when the first traveling vehicle is located in a first position being at an end of the first rail member closer to the connecting portion in the shared area, and the fourth detectable part is disposed at a position detectable by the fourth detector and the third detectable part is disposed at a position undetectable by the fourth detector when the second traveling vehicle is located in a second position being at an end of the second rail member closer to the connecting portion in the shared area;

a first stocker provided such that an article is able to be loaded and unloaded between the first stocker and the first traveling vehicle traveling in the first area; and a second stocker provided such that an article is able to be loaded and unloaded between the second stocker and the second traveling vehicle traveling in the second area; and a maintenance area disposed between the first stocker and the second stocker along an extending direction of the traveling rail and capable of accommodating the first traveling vehicle and the second traveling vehicles located in the shared area.

* * * * *